United States Patent Office.

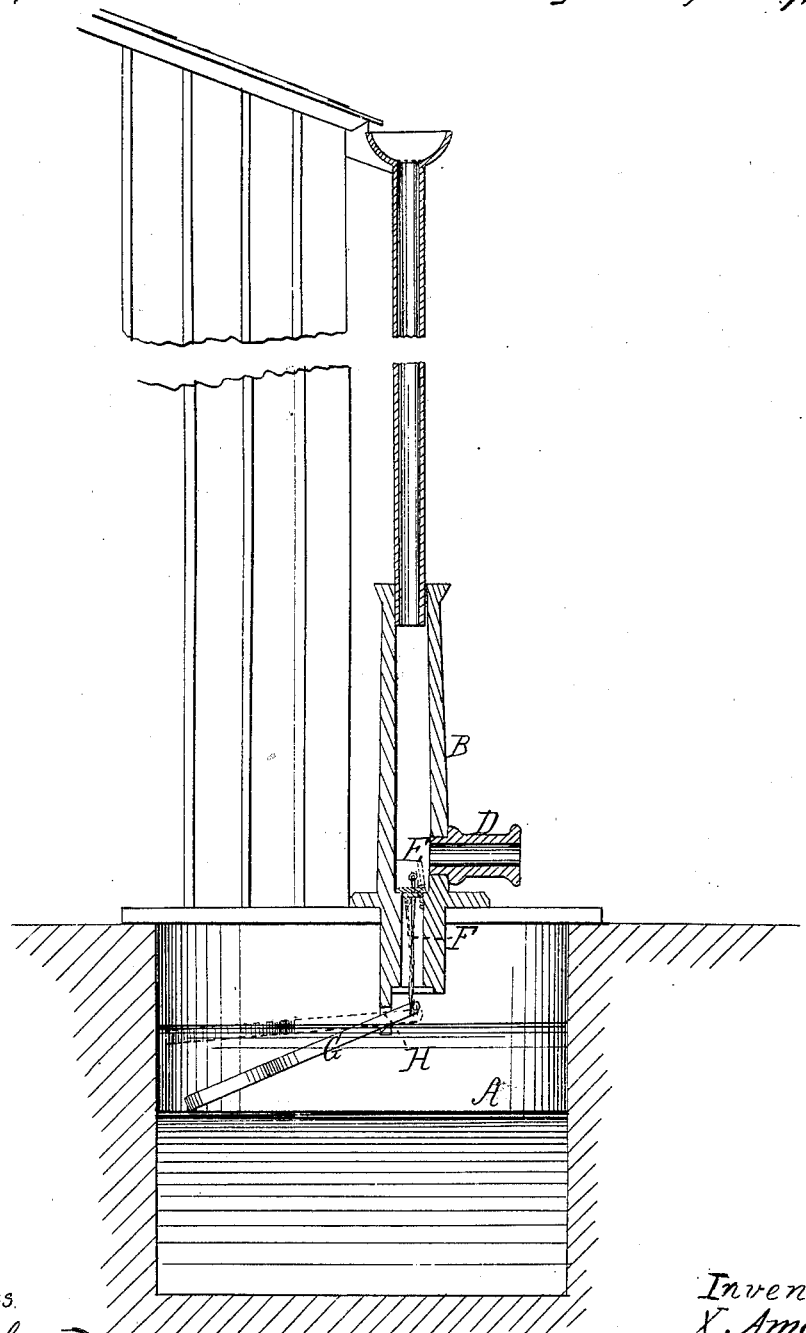

XAVIER AMOUN, OF SIDNEY, OHIO.

Letters Patent No. 94,694, dated September 14, 1869.

IMPROVEMENT IN RAIN-WATER CUT-OFFS FOR CISTERNS.

The Schedule referred to in these Letters Patent and making part of the same.

*To all whom it may concern:*

Be it known that I, XAVIER AMOUN, of Sidney, in the county of Shelby, and State of Ohio, have invented a new and improved Water-Regulator; and I do hereby declare that the following is a full, clear, and exact description thereof, which will enable others skilled in the art to make and use the same, reference being had to the accompanying drawings, forming part of this specification.

This invention relates to improvements in water-regulating apparatus for the supply-pipes of cisterns, &c., and has for its object to provide a simple arrangement of regulating-valve, to be operated by a float, to close the inlet-passage and turn the water into an escape-pipe when the cistern is sufficiently filled, and to open again and admit the supply, when the water falls in the cistern, and designed more especially to be used in cisterns which are supplied from the eaves of houses.

The drawing represents a sectional elevation of my improved apparatus.

A represents the cistern, and

B, the inlet-pipe, which receives the water from the gutters in any suitable way.

Near the bottom of the pipe B, and below the escape-pipe D, is a valve, E, opening upward, and connected by a rod, F, to the short arm of a float-lever, G, hinged to a fixed support at H.

This float-lever is so arranged that when the water rises, it will draw the valve E down, and close the passage of the water, causing it to pass off at the discharge-spout D, and when the water falls, it will open the valve again to admit the water to pass into the cistern.

This simple device is easily applied, and will so govern the height of the water as to prevent the cistern from overflowing, and cause the surplus to be delivered away through the conduit provided for it.

Having thus described my invention,

I claim as new, and desire to secure by Letters Patent—

The combination of the spout B, float G, rod F, valve E, and spout D, when arranged and applied in connection with a cistern or other water-receptacle, substantially as specified.

XAVIER AMOUN.

Witnesses:
S. SLUSSER,
H. H. SPRAGUE.